US012436119B2

United States Patent
Huang et al.

(10) Patent No.: US 12,436,119 B2
(45) Date of Patent: Oct. 7, 2025

(54) METHOD FOR DETERMINING FREE RADICALS IN CaO—Al2O3 SERIES OXIDE MELTS

(71) Applicant: Wuhan University of Science and Technology, Hubei (CN)

(72) Inventors: Ao Huang, Hubei (CN); Shenghao Li, Hubei (CN); Huazhi Gu, Hubei (CN); Lvping Fu, Hubei (CN); Meijie Zhang, Hubei (CN)

(73) Assignee: Wuhan University of Science and Technology, Wuhan (CN)

( * ) Notice: Subject to any disclaimer, the term of this patent is extended or adjusted under 35 U.S.C. 154(b) by 1044 days.

(21) Appl. No.: 17/396,261

(22) Filed: Aug. 6, 2021

(65) Prior Publication Data

US 2022/0178800 A1     Jun. 9, 2022

(30) Foreign Application Priority Data

Dec. 7, 2020 (CN) .......................... 202011418215.7

(51) Int. Cl.
*G01N 1/44*     (2006.01)
*G01N 21/73*     (2006.01)
(Continued)

(52) U.S. Cl.
CPC ........... *G01N 23/207* (2013.01); *G01N 21/73* (2013.01); *G01N 23/2005* (2013.01); *G01N 2223/605* (2013.01)

(58) Field of Classification Search
CPC ... G01N 23/207; G01N 21/73; G01N 23/2005
See application file for complete search history.

(56) References Cited

FOREIGN PATENT DOCUMENTS

CN    107192748 A    9/2017
CN    110161094 A    8/2019
(Continued)

OTHER PUBLICATIONS

Modeling and experiment of slag corrosion on the lightweight alumina refractory with static magnetic field facing green metallurgy A. Huang, P. Lian, L. Fu, H. Gu, Y. Zou J Min Metall. Sect B-Metall 54(2) 143-151 (Year: 2018).*

(Continued)

*Primary Examiner* — Lyle Alexander
*Assistant Examiner* — Dwan A Gerido
(74) *Attorney, Agent, or Firm* — Emerson, Thomson & Bennett, LLC; Roger D. Emerson; Seth J. Niemi

(57) ABSTRACT

The present disclosure provides a method for determining free radicals of CaO—Al$_2$O$_3$ series oxide melts. The method includes dividing the CaO—Al$_2$O$_3$ series oxide powder to into two aliquots by mass, putting into two identical corundum crucibles and tamping. The method also includes heating the two aliquots at the same high temperature in furnaces with and without a static magnetic field, respectively. Cylindrical samples with the same diameter and height, and only containing the melt at the bottom of the crucible and the slag reaction interface are drilled out from said two crucibles and ground into powder samples. The free radical relative content of the CaO—Al$_2$O$_3$ series oxide melts can be calculated from a ratio between the difference of the reaction mass contents of CaO in the two powder samples and the total mass content of CaO.

10 Claims, 1 Drawing Sheet

(51) Int. Cl.
   *G01N 23/2005* (2018.01)
   *G01N 23/207* (2018.01)

(56) References Cited

FOREIGN PATENT DOCUMENTS

| | | |
|---|---|---|
| CN | 110988010 A | 4/2020 |
| CN | 111650243 A | 9/2020 |
| JP | H0954078 A | 2/1997 |

OTHER PUBLICATIONS

P. Ma, et al., "Melt Free-Radical Grafting of Maleic Anhydride onto Biodegradable Poly(lactic acid) by Using Styrene as a Comonomer," Polymers (2014) vol. 6, pp. 1528-1543.
Y. Min, et. al, "Investigation of the Low Temperature Oxidation Coal Free Radical with the Electron Paramagnetic Resonance," Clean Coal Technology (2006) vol. 12, No. 1, p. 53-55.
Search Report directed to related CN202011418215.7 (2 pages).

\* cited by examiner

METHOD FOR DETERMINING FREE RADICALS IN CaO—Al2O3 SERIES OXIDE MELTS

TECHNICAL FIELD

The present disclosure belongs to the technical field of high-temperature melts. Particularly, it relates to providing a method for determining free radicals of CaO—$Al_2O_3$ series oxide melts.

BACKGROUND

In the pyrometallurgical process, molten slag not only is an inevitable product, but also has an important impact on the metallurgical process and the quality of its products. There are many types of metallurgical slags with complex system compositions, while it is mainly a high-temperature melt composed of various oxides such as CaO, $SiO_2$, $Al_2O_3$, MgO, FeO, $Fe_2O_3$, MnO, etc. Nowadays, there are four main theories of molten slag structure, namely respectively molecular structure theory, ionic structure theory, ion-molecule coexistence theory and polymer theory. By investigation, it is found that CaO—$Al_2O_3$ series oxide melts will generate free radicals at high temperatures. The prior art mainly uses electron paramagnetic resonance instrument to measure free radicals. Its principle is based on the fact that most of the total magnetic moment contributed by free radicals (over 99%) comes from the electron spin, then directly detection of the mismatched electrons contained in the atoms or molecules of the substance can measure free radicals. However, the electron paramagnetic resonance method is limited to detection under low and normal temperature conditions, and it is difficult to perform free radical determination of oxide melts at high temperatures.

DETAILED DESCRIPTION

Figure 1:
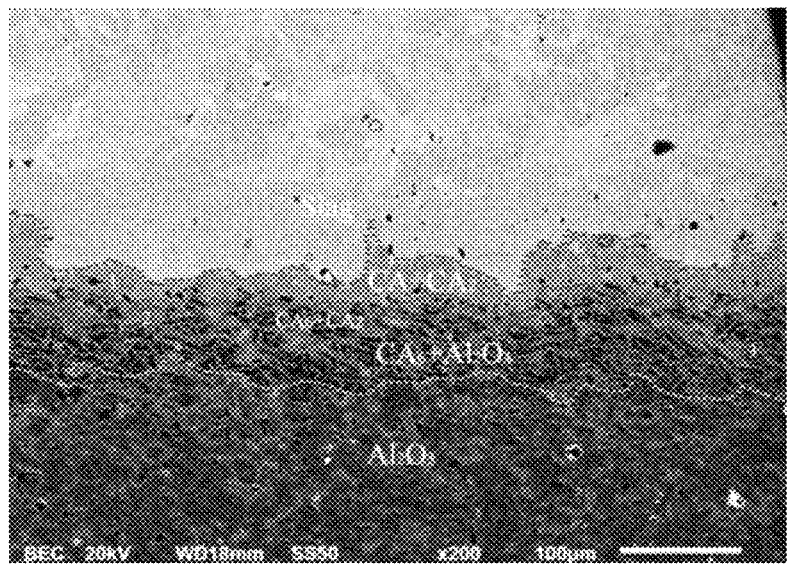
FIG. 1 shows the microstructure diagram of the reaction interface between the oxide melt and the corundum crucible after treatment in an ordinary high-temperature furnace (without magnetic field).

Due to lacking a method for determining high-temperature melt free radicals in the prior art, the present disclosure provides a method for determining free radicals of CaO—$Al_2O_3$ series oxide high-temperature melt with simple protocols and easy operations.

The present disclosure provides a method for determining free radicals of CaO—$Al_2O_3$ series oxide melts, having the following steps.

Said CaO—$Al_2O_3$ series oxide powder is divided into two aliquots by mass (i.e., two equal parts of the same mass) and put into two identical corundum crucibles, where the CaO—$Al_2O_3$ series oxide powder is tamped (compressed). The two aliquots are then heated up to the same temperature in an ordinary high temperature furnace and a static magnetic field high temperature furnace, respectively. After being held at the same temperature for the same time period, the two aliquots are then quenched. Cylindrical samples, which have the same diameter and the same height, and only contains the melt located at the bottom of the crucible and the slag reaction interface, are drilled out from the two corundum crucibles and ground into powder samples. The total mass contents of CaO therein are measured by chemical analysis. The mass contents of the calcium aluminate phase of two powder samples in said ordinary high temperature furnace and said static magnetic field high temperature furnace are measured by XRD (x-ray diffraction). The reaction mass contents of CaO are calculated from the mass content of the calcium aluminate phase. The absolute value of the difference between the reaction mass contents of CaO in the two powder samples is divided by the total mass content of CaO to obtain a ratio, which is the relative content of the free radical of the CaO—$Al_2O_3$ series oxide melts.

In some embodiments, a temperature of heating up in the ordinary high temperature furnace and the static magnetic field high temperature furnace is ≥1500° C., and the time period of holding is ≥0.5 hours.

In some embodiments, the magnetic field direction of said static magnetic field high temperature furnace is perpendicular to the bottom of said corundum crucible, and the magnetic induction intensity is ≥0.5 mT.

In some embodiments, the sum of the content of CaO and the content of $Al_2O_3$ in said CaO—$Al_2O_3$ series oxide powder is ≥70 wt %.

In some embodiments, the content of $Al_2O_3$ in said corundum crucible≥99.5 wt %.

In some embodiments, said calcium aluminate phase comprises one or more of calcium monoaluminate, calcium dialuminate and calcium hexaaluminate.

In some embodiments, said chemical analysis is selected from but not limited to inductively coupled plasma emission spectrometry (ICP-OES or ICP-AES), inductively coupled plasma mass spectrometry (ICP-MS) and atomic fluorescence analysis (AFS).

In some embodiments, the total mass content of CaO is obtained by calculating an average value of the mass content of CaO of the two cylindrical samples cut from the crucibles in said ordinary high temperature furnace and said static magnetic field high temperature furnace.

In the present disclosure, the total mass content of CaO is defined as the average value of the mass content of CaO of two cylindrical samples cut from crucibles placed in an ordinary high temperature furnace and a static magnetic field high temperature furnace, which is: (mass content of CaO of Cylindrical sample 1+mass content of CaO of cylindrical sample 2)/2. The mass content of the calcium aluminate phase is defined as the ratio of the total mass of all calcium aluminate phases including calcium monoaluminate, calcium dialuminate or calcium hexaaluminate in the cylindrical sample to the total mass of the cylindrical sample. The above-mentioned CaO reaction mass content is defined as the mass content of CaO that has undergone free radical reaction, which can be calculated from the mass content of the calcium aluminate phase in the cylindrical sample. Specifically, the mass of CaO in all calcium aluminate phases can be counted according to the calcium aluminate phase chemical formula. For example, assuming that the calcium aluminate phase is all made up by calcium hexaaluminate CA6, the proportion of CaO is 56/(56+10*26). The relative content of free radicals is equal to the ratio of the absolute value of the difference in the reaction mass contents of the CaO calculated from the two cylindrical samples respectively cut from the crucibles in the ordinary high-temperature furnace and the static magnetic field high-temperature furnace divided by the total mass content of CaO.

The present disclosure applies a static magnetic field parallel to the diffusion reaction direction of the oxide melt, directing toward the bottom of the corundum crucible, which can eliminate the electromagnetic damping effect of the static magnetic field. At the same time, the chemical bond of $CaO$—$Al_2O_3$ series oxides is broken very fast under high temperature, and it may be homogeneously split and generate free radicals. For example, the CaO ion bond will be homogeneously split under high temperature to form ·Ca· and O·, which will cause a free radical reaction with the $Al_2O_3$ in the corundum crucible to form a calcium aluminate phase. However, there is a large energy difference between singlet radicals and triplet radicals. In addition, the applied static magnetic field can cause the Zeeman splitting of the radicals, which results in the degeneration of singlet and triplet energy levels and intersystem hopping, and thereby produces triplet free radicals. However, the triplet free radicals cannot form bonds, which makes it difficult for the calcium aluminate reaction to proceed. A static magnetic field with suitable strength can inhibit the free radical reaction between the corundum crucible and the $CaO$—$Al_2O_3$ series oxide melts at high temperature, and thereby reduce the total production of calcium aluminate including calcium monoaluminate, calcium dialuminate and calcium hexaaluminate. The more free radicals in the $CaO$—$Al_2O_3$ series oxide melts, the more greatly it is inhibited by the static magnetic field. Thus, the relative content of free radicals in the $CaO$—$Al_2O_3$ series oxide melts can be measured.

The method for determining free radicals of $CaO$—$Al_2O_3$ series oxide melts provided by the present disclosure can determine the content of free radicals in high temperature oxide melt, and has simple protocols and easy operations.

The present disclosure will be further described below in conjunction with particular embodiments:

Example 1

In this example, the $CaO$—$Al_2O_3$ series oxide powder to be determined is divided into two aliquots by mass and put into two identical corundum crucibles, where the $CaO$—$Al_2O_3$ series oxide powder can be tamped. The two corundum crucibles are placed in an ordinary high temperature furnace and a static magnetic field high temperature furnace, respectively, where the magnetic field direction of the static magnetic field high temperature furnace can be perpendicular to the bottom of the crucible, and the magnetic induction intensity can be adjusted to 0.5 mT and remain constant. Then, both the ordinary high temperature furnace and the static magnetic field high temperature furnace are heated up to 1500° C., held for 0.5 hours and then quenched. Cylinderical samples with the same diameter and the same height, and containing only the melt at the bottom of the crucible and the slag reaction interface are drilled out from the two crucibles. Both of the cylindrical samples are ground into powder samples. The mass contents of CaO of the two cylindrical samples, respectively cut from the crucible of the ordinary high-temperature furnace and the static magnetic field high temperature furnace, are measured by ICP-OES, and then the average value of them is calculated to obtain the total mass content of CaO as being 20 wt %. By using XRD quantitative analysis, the mass content of the calcium aluminate phase in the crucible placed in the ordinary high temperature furnace is 12 wt %, and the mass content of the calcium aluminate phase in the crucible placed in the static magnetic field high temperature furnace is 8 wt %. Then, the corresponding reaction mass content of CaO is calculated according to the chemical formula composition of calcium aluminate. In this example, the calculation shows that the reaction mass content of CaO in the cylindrical sample cut from the crucible placed in the ordinary high-temperature furnace is 3.4 wt %, and the reaction mass content of CaO in the cylindrical sample cut from the crucible placed in the static magnetic field high-temperature furnace is 1.0 wt %, so that the absolute value of the difference between the reaction mass contents of CaO in the two powder samples is 2.4 wt %. Finally, the absolute value of the difference between the reaction mass contents of CaO (i.e., 2.4 wt %) is divided by the total mass content of CaO (i.e., 20 wt %) to obtain a ratio of 12%, which is the relative content of free radicals in the $CaO$—$Al_2O_3$ system oxide melts in this example.

In this example, the $CaO$—$Al_2O_3$ series oxide powder has $CaO+Al_2O_3=70$ wt %. The content of $Al_2O_3$ in the corundum crucible is 99.5 wt %. The calcium aluminate phase includes calcium monoaluminate, calcium dialuminate and calcium hexaaluminate.

Figure 2:
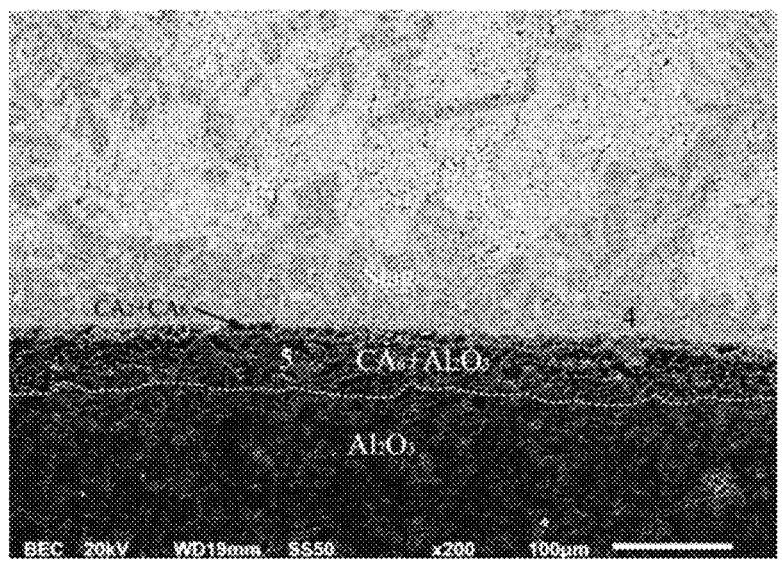
FIG. 2 shows the microstructure diagram of the reaction interface between the oxide melt and the corundum crucible after treatment in a high-temperature static magnetic field furnace (with a magnetic field).

The cross-sectional microstructure diagrams of the two cylinders drilled out from said two crucibles are shown in FIG. 1 and FIG. 2. FIG. 1 shows the microstructure diagram of the reaction interface between the oxide melt and the corundum crucible after treatment in an ordinary high-temperature furnace (without magnetic field). FIG. 2 shows the microstructure diagram of the reaction interface between the oxide melt and the corundum crucible after treatment in a high-temperature static magnetic field furnace (with a magnetic field). By comparing FIGS. 1 and 2, it can be seen that under the action of a static magnetic field, the reaction between the free radicals formed by the homogeneous split of the $CaO$—$Al_2O_3$ series oxide at high temperature and the $Al_2O_3$ crucible is obviously inhibited, and the total production of the calcium aluminate phase is greatly reduced. Therefore, the relative content of free radicals in the $CaO$—$Al_2O_3$ series oxide melts can be calculated by comparing the difference in the reaction mass content of CaO of the $CaO$—$Al_2O_3$ series oxide melts in the ordinary high-temperature furnace and the static magnetic field high-temperature furnace.

Example 2

In this example, the $CaO$—$Al_2O_3$ series oxide powder to be determined is divided into two aliquots by mass, put into two identical corundum crucibles and tamped. The two corundum crucibles are placed in an ordinary high temperature furnace and a static magnetic field high temperature furnace, respectively, making the magnetic field direction of the static magnetic field high temperature furnace perpendicular to the bottom of the crucible, and adjusting the magnetic induction intensity to 0.5 mT and keeping the intensity at the value. Then, both the ordinary high temperature furnace and the static magnetic field high temperature furnace are heated up to 1600° C., held for 1 hour and then quenched. Cylindrical samples with the same diameter and containing only the melt at the bottom of the crucible and the slag reaction interface are drilled out from said two crucibles. Both of the cylindrical samples are ground into powder samples. The mass contents of CaO of the two cylindrical samples respectively cut from the crucible of the ordinary high-temperature furnace and the static magnetic field high temperature furnace are measured by AFS. Then, the average value of them is calculated to obtain the total mass content of CaO thereof as being 20 wt %. By using XRD quantitative analysis, the mass content of the calcium aluminate phase in the crucible placed in the ordinary high temperature furnace is 15 wt %, and the mass content of the calcium aluminate phase in the crucible placed in the static magnetic field high temperature furnace is 10 wt %. Then, the corresponding reaction mass content of CaO is calculated according to the chemical formula composition of calcium aluminate. In this example, the calculation shows that the reaction mass content of CaO in the cylindrical sample cut from the crucible placed in the ordinary high-temperature furnace is 4.5 wt %, and the reaction mass content of CaO in the cylindrical sample cut from the crucible placed in the static magnetic field high-temperature furnace is 1.3 wt %, so that the absolute value of the difference between the reaction mass contents of CaO in the two powder samples is 3.2 wt %. Finally, the absolute value of the difference between the reaction mass contents of CaO as 3.2 wt % is divided by the total mass content of CaO as 20 wt % to obtain a ratio of 16%, which is the relative content of free radicals in the $CaO-Al_2O_3$ series oxide melts in this example.

In this example, the $CaO-Al_2O_3$ series oxide powder has $CaO+Al_2O_3=80$ wt %. The content of $Al_2O_3$ in the corundum crucible is 99.7 wt %. The calcium aluminate phase includes calcium monoaluminate, calcium dialuminate and calcium hexaaluminate.

Example 3

In this example, the $CaO-Al_2O_3$ series oxide powder to be determined is divided into two aliquots by mass, put into two same corundum crucibles and tamped. The two corundum crucibles are placed in an ordinary high temperature furnace and a static magnetic field high temperature furnace, respectively, making the magnetic field direction of the static magnetic field high temperature furnace perpendicular to the bottom of the crucible, and adjusting the magnetic induction intensity to 1.5 mT and keeping it at the value. Then, both the ordinary high temperature furnace and the static magnetic field high temperature furnace are heated up to 1800° C., held for 1.5 hours and then quenched. Cylindrical samples with the same diameter and containing only the melt at the bottom of the crucible and the slag reaction interface are drilled out from said two crucibles. Both of the cylindrical samples are ground into powder samples. The mass contents of CaO of the two cylindrical samples, respectively cut from the crucible of the ordinary high-temperature furnace and the static magnetic field high temperature furnace, are measured by ICP-MS, and then the average value of them is calculated to obtain the total mass content of CaO therein as being 20 wt %. By using XRD quantitative analysis, the mass content of the calcium aluminate phase in the crucible placed in the ordinary high temperature furnace is 16 wt %, and the mass content of the calcium aluminate phase in the crucible placed in the static magnetic field high temperature furnace is 11 wt %. Then, the corresponding reaction mass content of CaO is calculated according to the chemical formula composition of calcium aluminate. In this example, the calculation shows that the reaction mass content of CaO in the cylindrical sample cut from the crucible placed in the ordinary high-temperature furnace is 5.0 wt %, and the reaction mass content of CaO in the cylindrical sample cut from the crucible placed in the static magnetic field high-temperature furnace is 1.4 wt %, so that the absolute value of the difference between the reaction mass contents of CaO in the two powder samples is 3.6 wt %. Finally, the absolute value of the difference between the reaction mass contents of CaO as 3.6 wt % is divided by the total mass content of CaO as 20 wt % to obtain a ratio of 18%, which is the relative content of free radicals in the $CaO-Al_2O_3$ series oxide melts in this example.

In this example, the $CaO-Al_2O_3$ series oxide powder has $CaO+Al_2O_3=90$ wt %. The content of $Al_2O_3$ in the corundum crucible is 99.9 wt %. The calcium aluminate phase includes calcium monoaluminate, calcium dialuminate and calcium hexaaluminate.

It should be pointed out that the above detailed descriptions are all exemplary and are intended to provide further illustrations for the present application. Unless otherwise specified, all technical and scientific terms used herein have the same meaning as commonly understood by those of ordinary skill in the technical field to which the present application belongs.

It should be noted that the terms used here are only for describing particular embodiments, and are not intended to limit the exemplary embodiments showed in the present application. As used herein, unless the context clearly dictates otherwise, the singular form is also intended to include the plural form. In addition, it should also be understood that when the terms "comprising" and/or "including" are used in this specification, they indicate that there are features, steps, operations, devices, components, and/or combinations thereof.

In addition, the terms "including" and "having" and any variations of them are intended to cover non-exclusive inclusions. For example, a process, method, system, product, or device that includes a series of steps or units is not necessarily limited to those clearly listed steps or units, but may include those that are not clearly listed or further steps or units inherent to these processes, methods, products, or device.

In the above detailed description, reference is made to the accompanying drawings, which form a part of the present disclosure. In the drawings, similar symbols typically identify similar components, unless the context dictates otherwise. The illustrated embodiments described in the detailed specification, drawings, and claims are not meant to be limiting. Other embodiments can be used, and other changes can be made without departing from the spirit or scope of the subject matters presented herein.

The foregoing descriptions are only preferred examples of the present disclosure and are not used to limit the present disclosure. For those skilled in the art, the present disclosure can have various modifications and changes. Any modification, equivalent replacement, improvement, etc. made within the spirit and principle of the present disclosure should be included in the protection scope of the present disclosure.

The invention claimed is:

1. A method for determining a free radical relative content of free radicals generated from $CaO-Al_2O_3$ series oxide melts, comprising:
dividing a $CaO-Al_2O_3$ series oxide powder into two aliquots of a same mass;
tamping the two aliquots inside two identical corundum crucibles, respectively;
placing the two corundum crucibles with the two aliquots into two high temperature furnaces, wherein a first corundum crucible having a first aliquot is placed in an ordinary high temperature furnace and a second corundum crucible having a second aliquot is placed in a static magnetic field high temperature furnace;
heating the two aliquots at a same temperature for a same time period followed by quenching;

drilling out a first cylindrical sample with a first diameter and a first height from the first corundum crucible and drilling out a second cylindrical sample with a second diameter and a second height from the second corundum crucible, wherein the first diameter is the same as the second diameter and the first height is the same as the second height, and the first and the second cylindrical samples comprise melts located at bottoms of the two corundum crucibles and slag reaction interfaces, wherein the two corundum crucibles are placed in the furnaces and the slag reaction interfaces are located between the oxide melts and the bottoms of the corundum crucibles;

grounding the first cylindrical sample and the second cylindrical sample into a first powder sample and a second powder sample, respectively;

measuring, by a chemical analysis, a total mass content of CaO in the first and second powder samples;

measuring, by X-ray diffraction, a first mass content of calcium aluminate phase in the first powder sample and a second mass content of the calcium aluminate phase in the second powder sample;

calculating a first reaction mass content of CaO from the first mass content of the calcium aluminate phase in the first powder sample and a second reaction mass content of CaO from the second mass content of the calcium aluminate phase in the second power powder sample;

dividing a difference between the first and the second reaction mass contents of CaO by the total mass content of CaO to produce a resulting ratio; and determining a free radical relative content of free radicals generated from the $CaO$—$Al_2O_3$ series oxide melts using the resulting ratio.

2. The method of claim 1, wherein the heating the two aliquots comprises heating the aliquots at a temperature higher than 1500° C.

3. The method of claim 1, wherein the heating the two aliquots comprises heating the aliquots for a time period longer than 0.5 hours.

4. The method of claim 1, further comprising:
making a magnetic field direction of the static magnetic field high temperature furnace perpendicular to the bottom of the second corundum crucible.

5. The method of claim 4, further comprising:
keeping a magnetic induction intensity in the static magnetic field high temperature furnace higher than 0.5 mT.

6. The method of claim 1, further comprising:
selecting the $CaO$—$Al_2O_3$ series oxide powder, wherein a sum of a weight percentage of CaO and a weight percentage of $Al_2O_3$ in the $CaO$—$Al_2O_3$ series oxide powder is higher than 70 wt %.

7. The method of claim 1, further comprising:
selecting the two identical corundum crucibles, wherein a content of $Al_2O_3$ in each of the two identical corundum crucibles is higher than 99.5 wt %.

8. The method of claim 1, wherein the measuring the first and the second mass contents of the calcium aluminate phase comprises measuring the first and the second mass contents of one or more of calcium monoaluminate, calcium dialuminate or calcium hexaaluminate.

9. The method of claim 1, wherein the measuring, by the chemical analysis, the total mass content of CaO comprises measuring by an inductively coupled plasma emission spectrometry, an inductively coupled plasma mass spectrometry, and/or an atomic fluorescence analysis.

10. The method of claim 1, wherein the measuring the total mass content of CaO comprises calculating an average value of mass contents of CaO in the first and the second cylindrical samples drilled out from the first and the second corundum crucibles.

* * * * *